(12) United States Patent
Stephenson et al.

(10) Patent No.: US 9,745,142 B2
(45) Date of Patent: Aug. 29, 2017

(54) CONVEYOR ASSEMBLY

(71) Applicant: Stephenson Technologies Inc., Barrie (CA)

(72) Inventors: Robert Stephenson, Barrie (CA); Paul Adams, Barrie (CA)

(73) Assignee: Stephenson Technologies Inc., Barrie, ON (CA)

( * ) Notice: Subject to any disclaimer, the term of this patent is extended or adjusted under 35 U.S.C. 154(b) by 0 days.

(21) Appl. No.: 15/148,626

(22) Filed: May 6, 2016

(65) Prior Publication Data

US 2017/0217690 A1   Aug. 3, 2017

Related U.S. Application Data

(63) Continuation-in-part of application No. 15/013,357, filed on Feb. 2, 2016.

(51) Int. Cl.
*B65G 45/22* (2006.01)
*B65G 15/62* (2006.01)
*B65G 21/00* (2006.01)

(52) U.S. Cl.
CPC .............. *B65G 45/22* (2013.01); *B65G 15/62* (2013.01); *B65G 21/00* (2013.01); *B65G 2201/0294* (2013.01)

(58) Field of Classification Search
CPC .......... B65G 45/10; B65G 45/12; B60S 3/004
USPC ................................................. 198/494, 495
See application file for complete search history.

(56) References Cited

U.S. PATENT DOCUMENTS

| | | | |
|---|---|---|---|
| D514,755 S | 2/2006 | Essenberg | |
| D616,565 S | 5/2010 | Essenberg | |
| 8,413,669 B2 * | 4/2013 | Barreyre | B60S 3/004 |
| | | | 134/124 |
| 8,662,292 B2 * | 3/2014 | Brackemyer | B65G 41/006 |
| | | | 198/494 |
| 2006/0191773 A1 | 8/2006 | Horn | |
| 2007/0068554 A1 | 3/2007 | Essenberg | |
| 2010/0206341 A1 | 8/2010 | Essenburg | |
| 2012/0216835 A1 | 8/2012 | Essenburg | |
| 2013/0200061 A1 | 8/2013 | Barreyre | |

FOREIGN PATENT DOCUMENTS

| | | |
|---|---|---|
| FR | 2068986 A5 | 9/1971 |
| GB | 1100583 A | 1/1968 |
| GB | 1114418 A | 5/1968 |
| GB | 1185331 A | 3/1970 |
| GB | 1385800 A | 2/1975 |
| GB | 1398266 A | 6/1975 |
| GB | 1432772 A | 4/1976 |
| GB | 8429035 | 12/1984 |
| GB | 2150093 B1 | 11/1986 |

\* cited by examiner

*Primary Examiner* — William R Harp
(74) *Attorney, Agent, or Firm* — Millman IP Inc

(57) ABSTRACT

In an aspect, a conveyor system for moving a wheeled structure through a service line is provided. The conveyor system comprises at least one endless belt mounted longitudinally through the service line. The belt has an upper transport portion for moving the vehicle through the service line, and a lower return portion with a support deck below the upper transport portion to support the belt. A debris deflector is mounted between the upper transport portion and the lower return portion to protect the lower return portion from debris falling through the support deck.

24 Claims, 17 Drawing Sheets

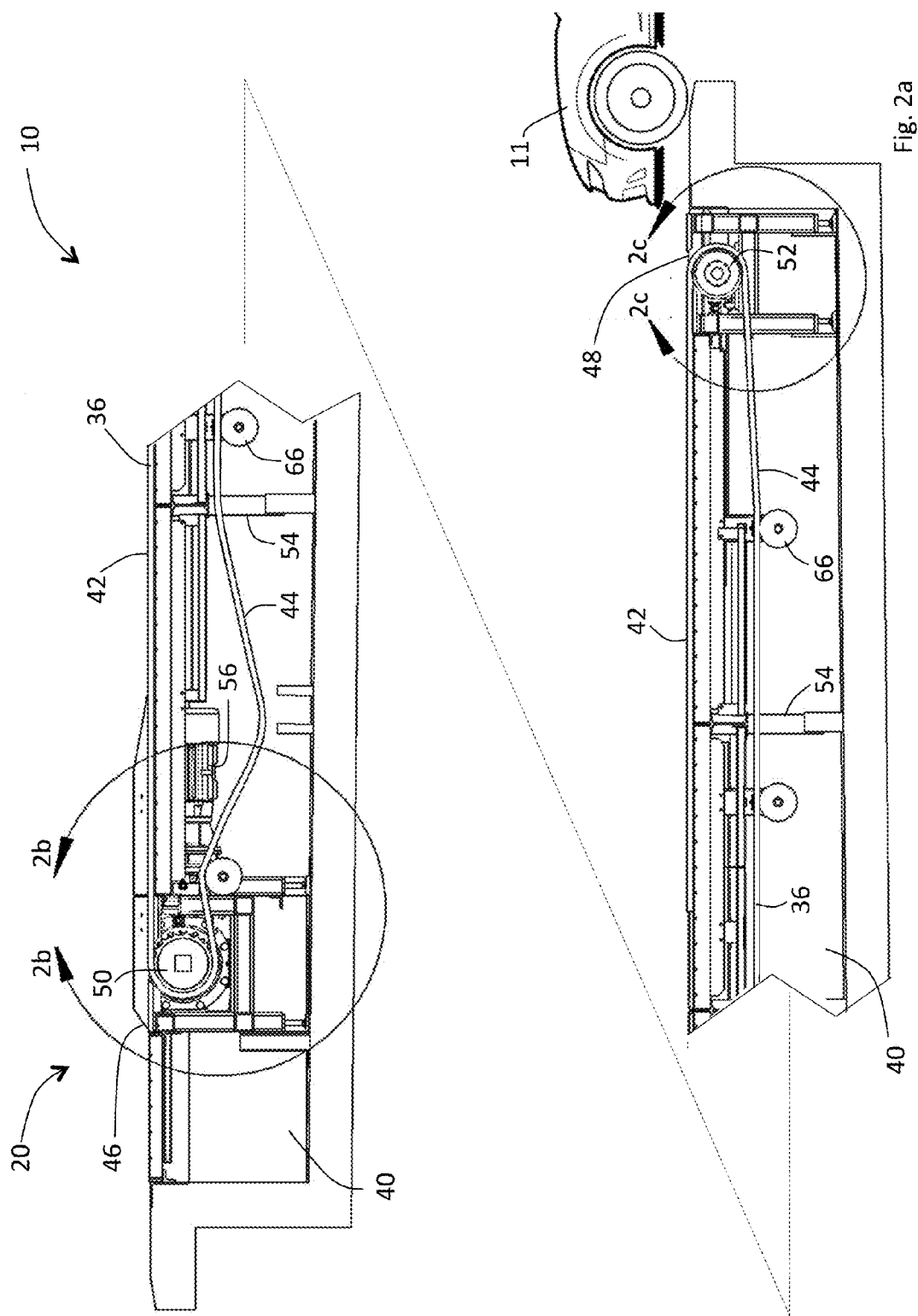

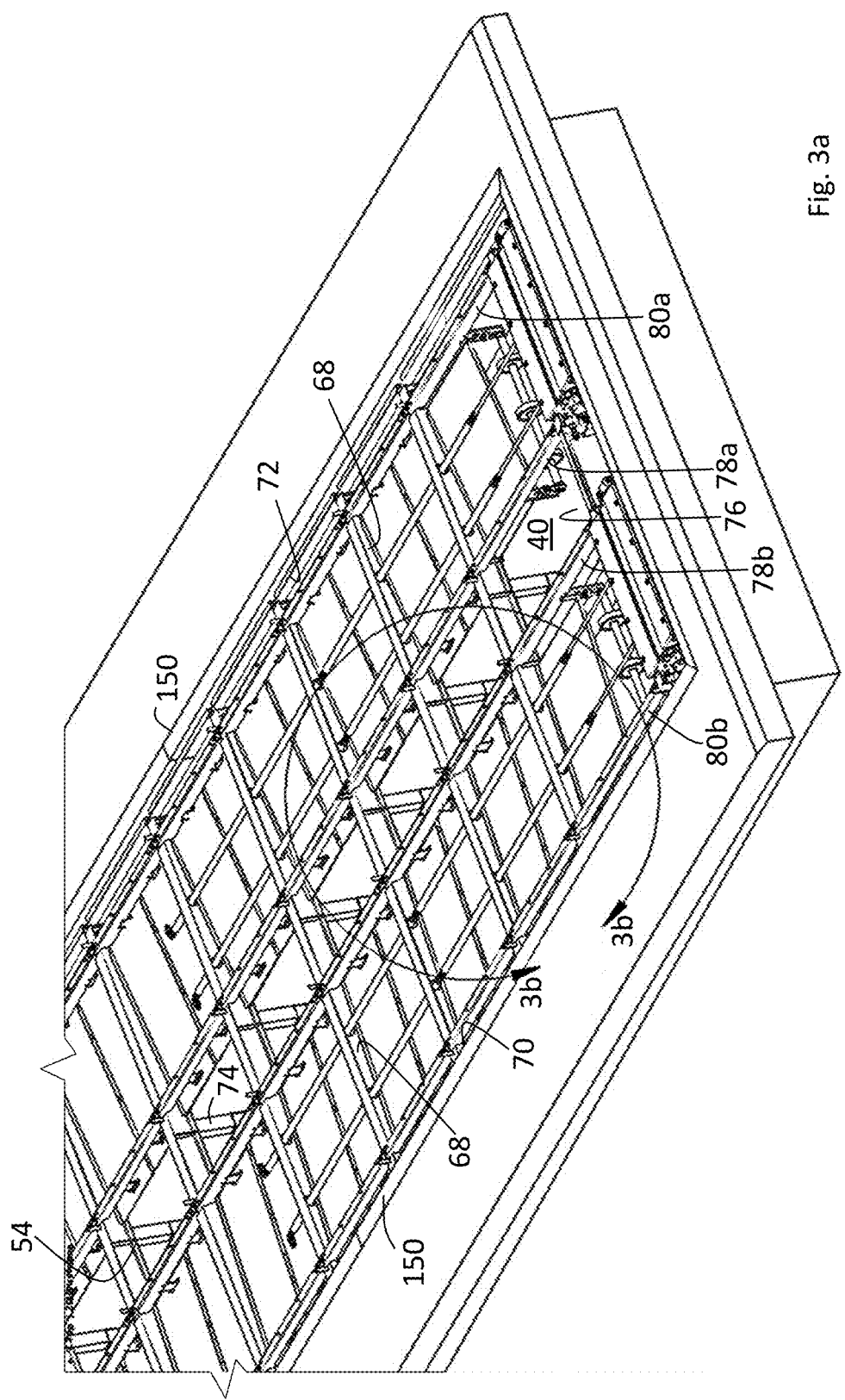

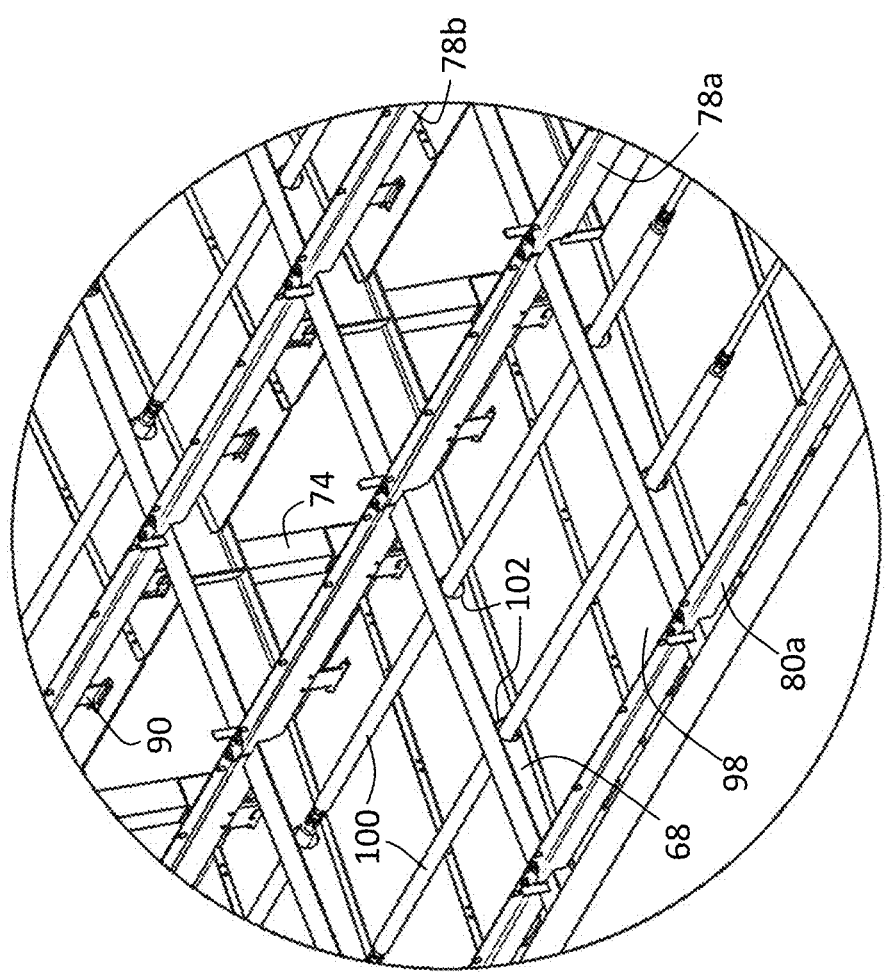

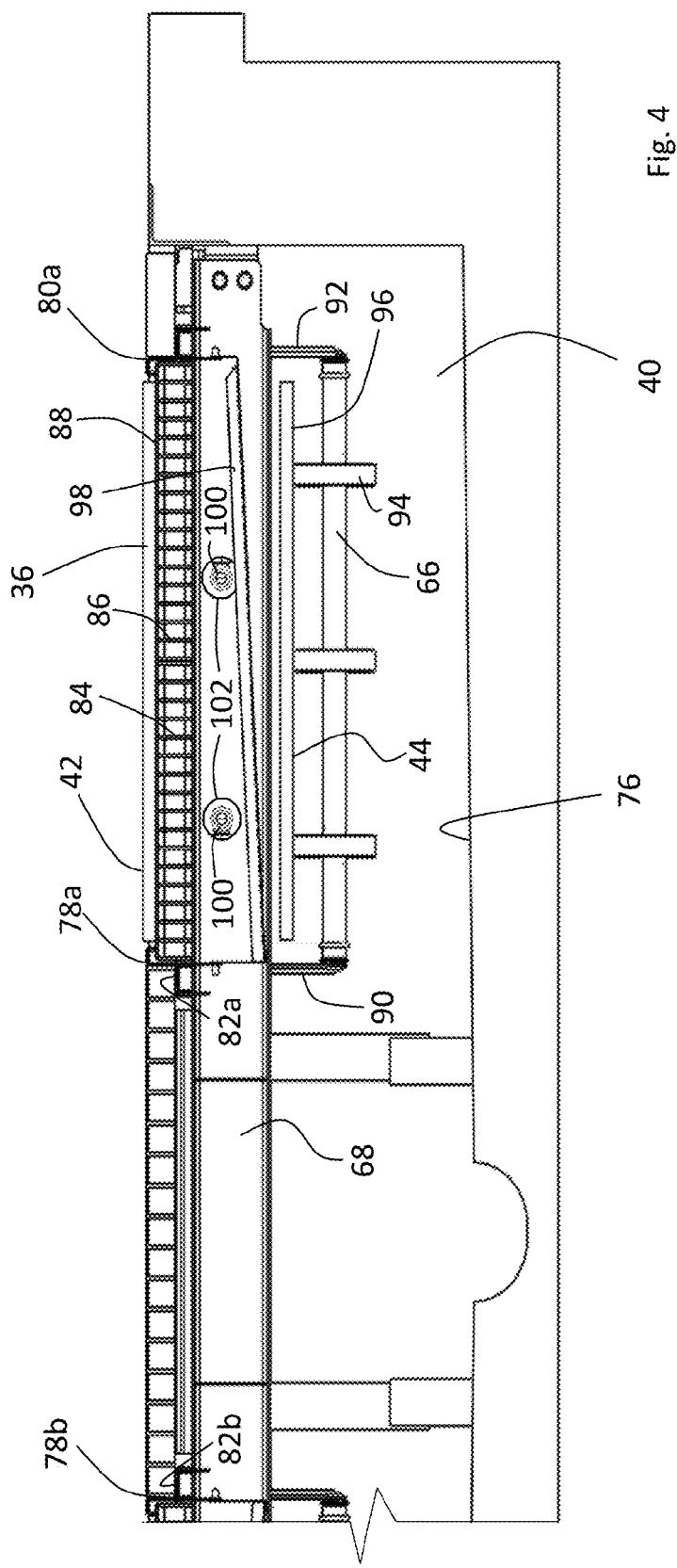

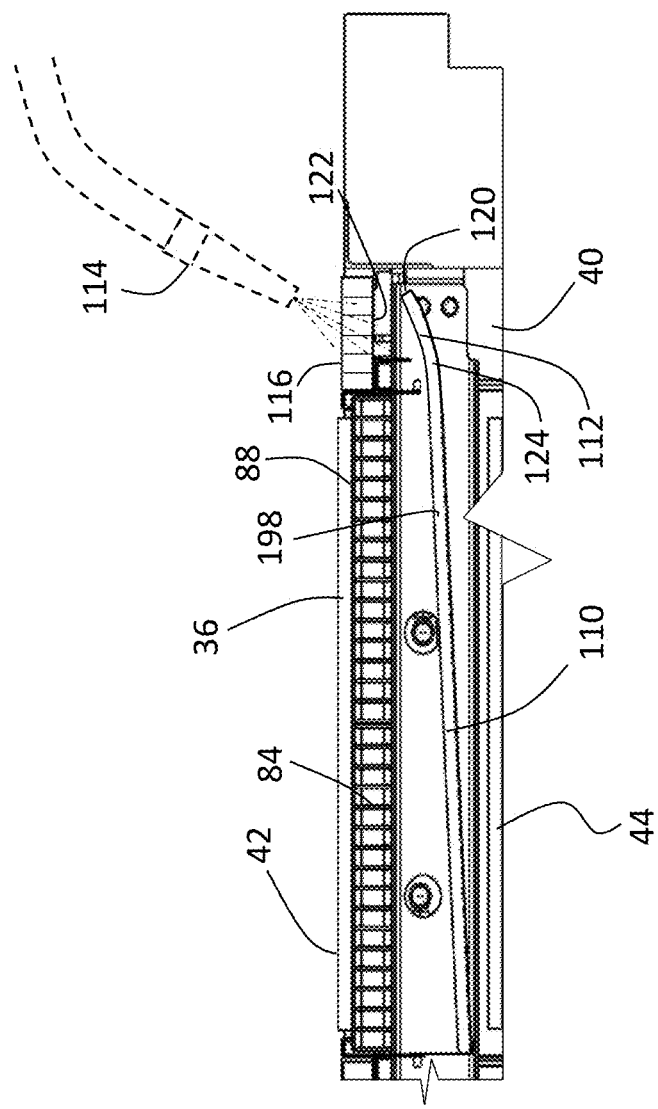

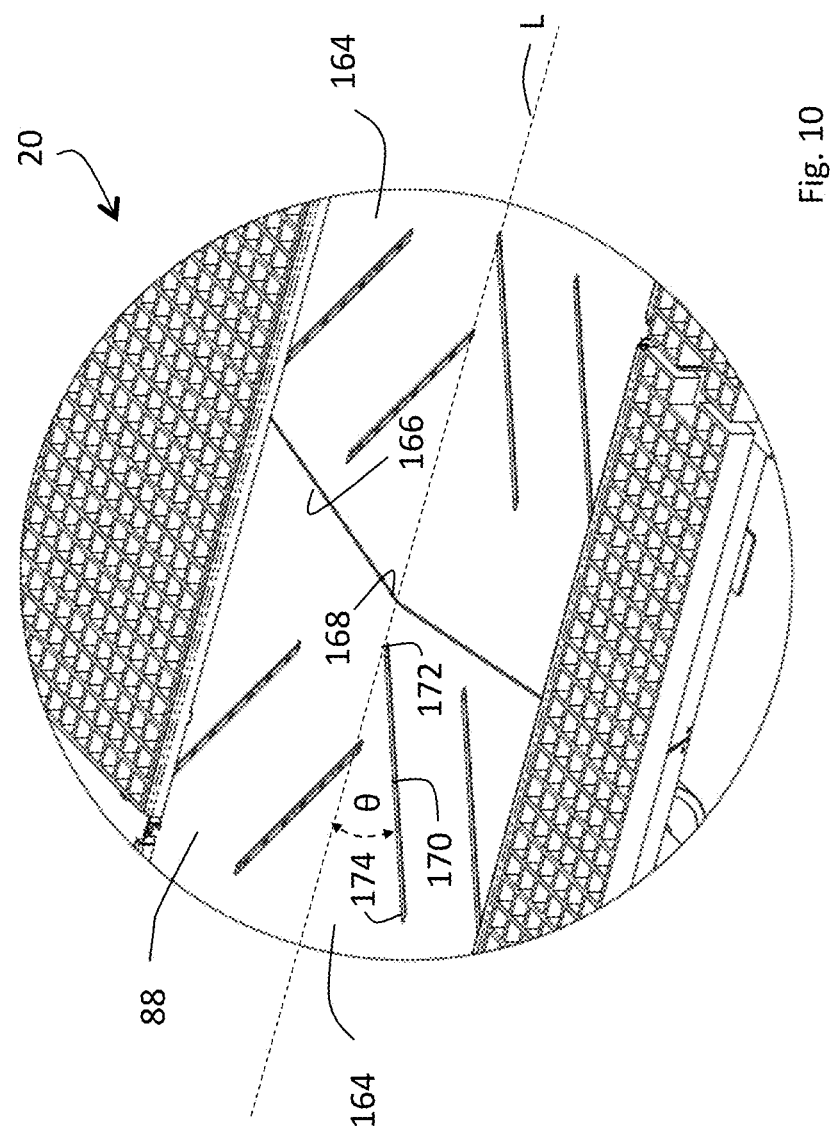

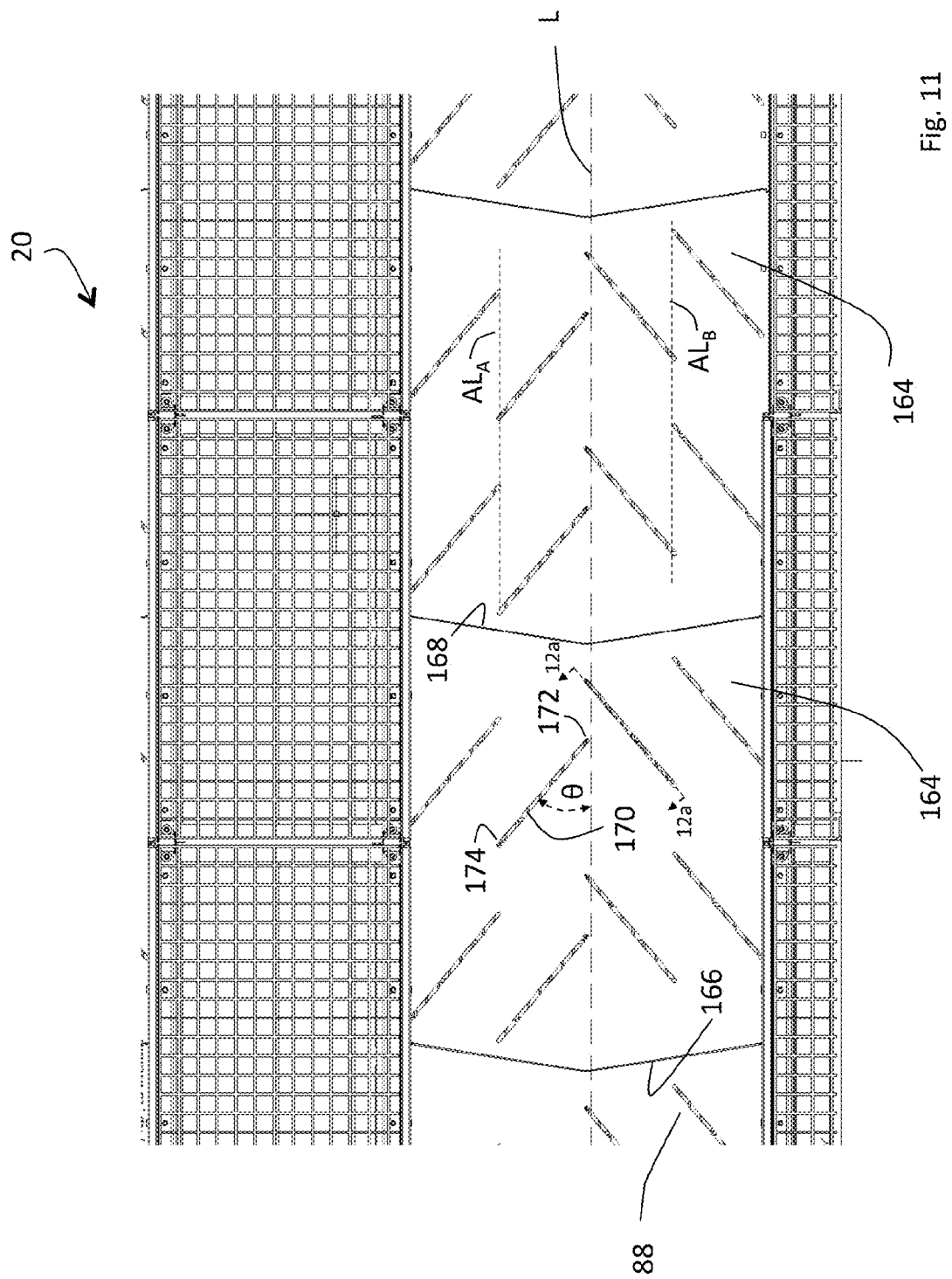

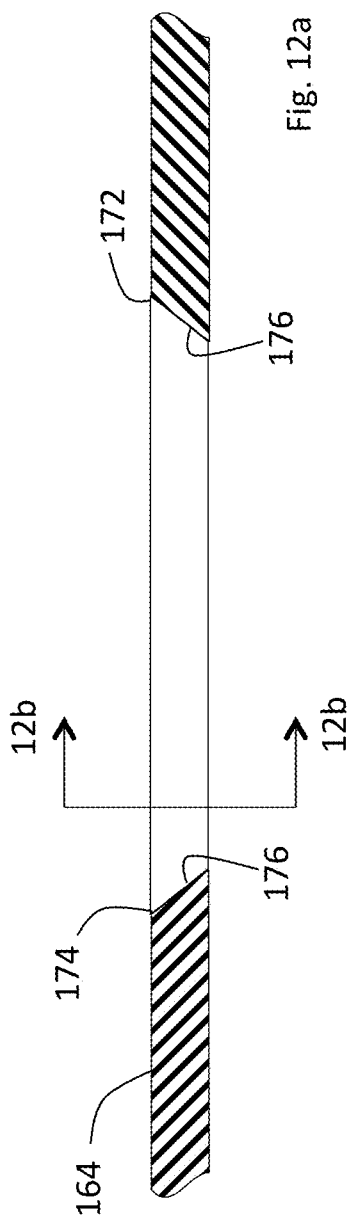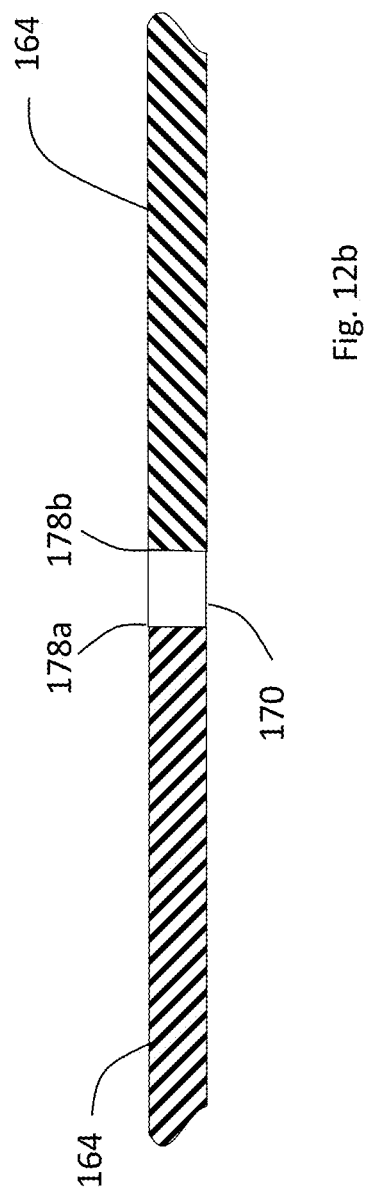

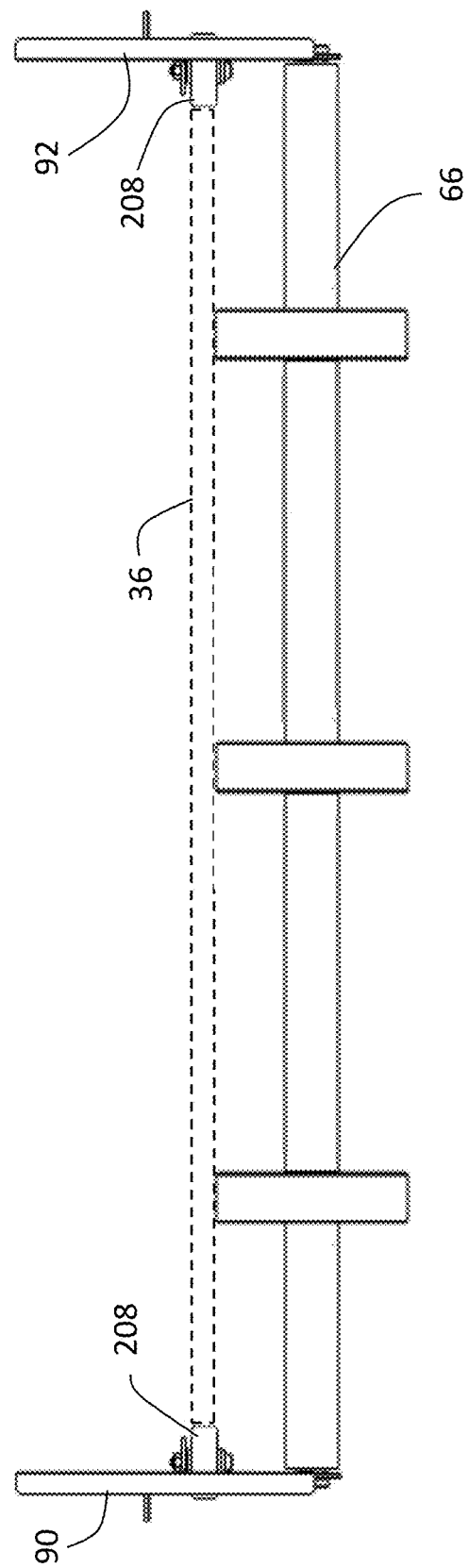

CONVEYOR ASSEMBLY

CROSS-REFERENCE TO RELATED APPLICATIONS

This application is a continuation-in-part application of U.S. patent application Ser. No. 15/013,357 filed Feb. 2, 2016, the entire contents of which are incorporated herein by reference.

FIELD

The present disclosure relates to the field of conveyor systems for transporting wheeled structures, and in particular to a conveyor system suitable for use in an automatic vehicle wash station.

BACKGROUND

Conveyor systems have long been used to assist in the transport of materials from one location to another, in particular with respect to heavy and cumbersome items. The use of conveyor systems in assembly lines is well documented, with perhaps Henry Ford being the most famous proponent of the technology of the $20^{th}$ century.

Conveyors come in a variety of configurations, suiting a wide array of implementations. Belt conveyors in particular have been widely adopted due to their wide versatility and adaptability. For example, belt conveyors are commonly used in the warehousing, manufacturing, and mining sectors. More recently, belt conveyors have found application in the automotive industry, in particular with respect to automated car wash stations.

A recent advancement in automated car washes is the synchronous dual-belt conveyor system for moving the vehicle through the wash tunnel. The dual-belt system is especially suited for modern vehicles as the previous roller conveyor system with alignment rails has the potential to interfere with low profile rims and lower underbody clearance. The older roller conveyor system also required more alignment precision when entering the wash tunnel, resulting in many car owners turning to alternate cleaning options.

With the introduction of the dual-belt car wash conveyor system, and the adoption of this technology in an increasing number of car wash stations, new challenges are faced, in particular with respect to cold weather installations. During winter months in regions of colder temperatures, the wash tunnels may experience freeze events in which water freezes upon the belt and underlying substructure. The shear loads placed upon the conveyor drive mechanisms can be considerable, leading to damage and servicing down-time.

It is recognized that a need still exists to provide a conveyor system capable of operating in regions of colder temperature with lower risks associated with freeze events. It has also been recognized that a need still exists to provide a conveyor system designed for ease of installation, and reduced maintenance requirements and/or associated downtime.

SUMMARY

According to an aspect of an embodiment, a conveyor system for use in moving a wheeled structure through a service line is provided. The conveyor system comprises at least one endless belt mounted in a longitudinal direction through the service line. The endless belt has an upper transport portion adapted to move the vehicle through the service line, and a lower return portion. A support deck is positioned below the upper transport portion of the endless belt to support the endless belt. A debris deflector is mounted between the upper transport portion and the lower return portion of the endless belt to protect the lower return portion from debris falling through the support deck.

BRIEF DESCRIPTION OF FIGURES

The foregoing and other features and advantages of the disclosure will be apparent from the following description of embodiments hereof as illustrated in the accompanying drawing. The accompanying drawings, which are incorporated herein and form a part of the specification, further serve to explain the principles of the disclosure and to enable a person skilled in the pertinent art to make and use the disclosure. The drawings are not to scale.

FIG. 2a is a partial side sectional view of the conveyor system according to the embodiment of FIG. 1.

FIG. 2b is a partial side sectional view of the conveyor system with reference to line 2b-2b of FIG. 2a.

FIG. 2c is a partial side sectional view of the conveyor system with reference to line 2c-2c of FIG. 2a.

FIG. 3a is a partial isometric view of the conveyor system according to the embodiment of FIG. 1, highlighting features of the conveyor frame.

FIG. 3b is a partial isometric view of the conveyor system with reference to line 3b-3b of FIG. 3a.

FIG. 4 is a partial transverse sectional view of the conveyor system according to FIG. 1, highlighting features in the region of the endless belt.

FIG. 5 is a partial transverse section view of the conveyor system according to FIG. 1, showing an alternative embodiment of the debris deflector.

FIG. 10 is a partial isometric view of the conveyor system according to FIG. 1, detailing features of the wear plates.

FIG. 11 is a partial plan view of the conveyor system according to FIG. 1, detailing features of the wear plates.

FIG. 12a is a sectional view of the wear plate with reference to line 12a-12a of FIG. 11, showing features of the debris slot.

FIG. 12b is a sectional view of the wear plate with reference to line 12b-12b of FIG. 12a, showing features of the debris slot.

FIG. 16 is an enlarged front view of an alternate embodiment of the guide member, showing the use of side rollers.

DETAILED DESCRIPTION

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Figure 1:
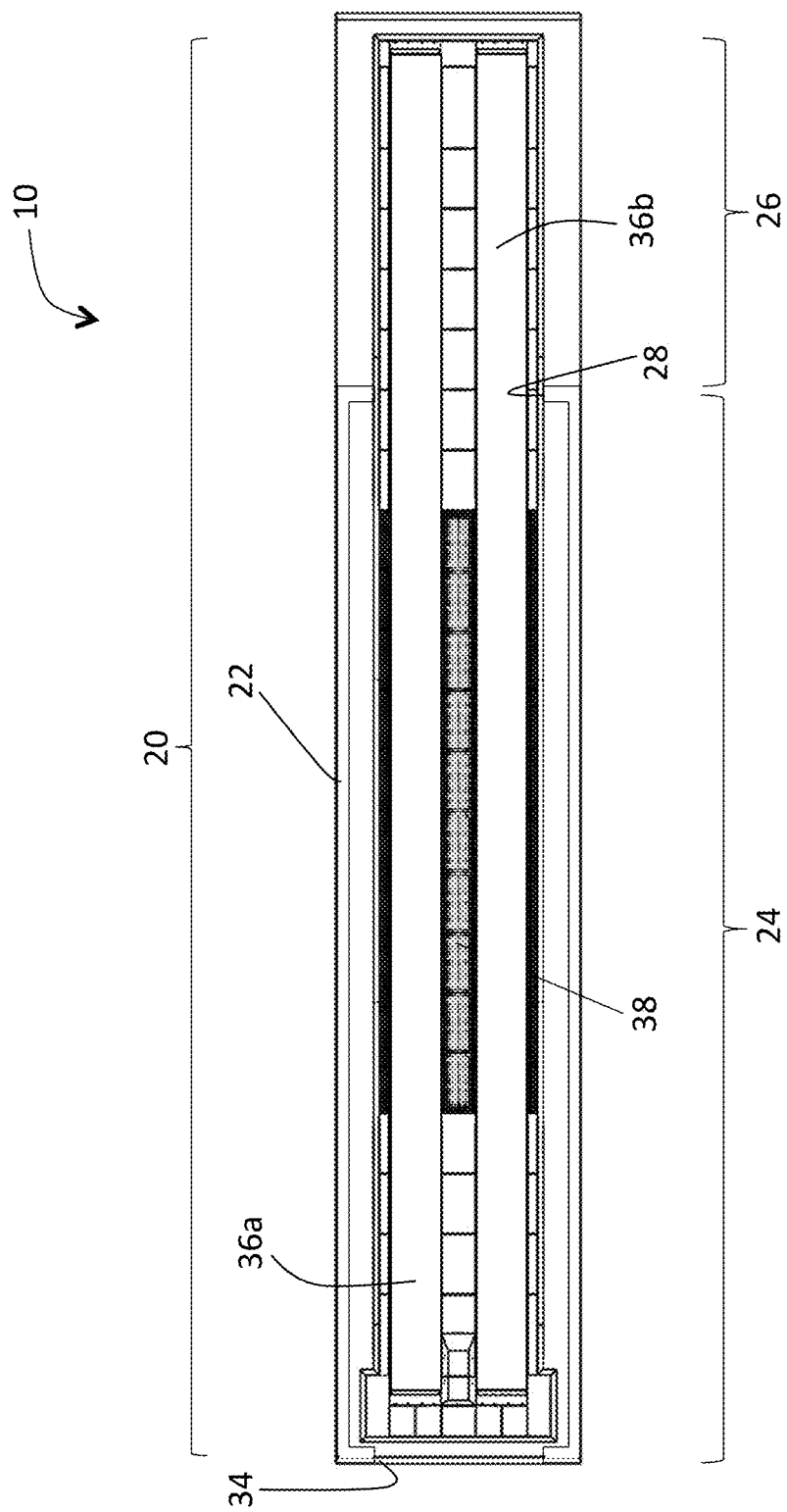
FIG. 1 is a plan view of the conveyor system according to an embodiment hereof.

Reference is made to FIG. 1, which shows a service line 10 having a conveyor system 20 for moving a wheeled structure 11, in accordance with an embodiment. As used herein, the term service line is not intended to be restrictive, and may encompass for example an automatic vehicle wash station (e.g. for cars, commercial trucks, etc.), a manufacturing or assembly line (e.g. for cars, trucks, non-powered mobile units, etc.) as well as a repair or detailing station (e.g. for cars, trucks, etc.). In addition, the term wheeled structure is not intended to be restrictive, and may encompass for example powered landborne vehicles (e.g. trucks, automobiles, tractors, recreational vehicles, etc.), non-powered landborne mobile units (e.g. recreational trailers, utility trailers, etc.), and airborne vehicles (e.g. airplanes, etc.).

The conveyor system 20 is adapted to transport a wheeled structure along a longitudinal length of the service line 10. As presented in FIG. 1, service line 10 is shown in the form of a car wash station having a wash tunnel 22. Accordingly, the conveyor system 20 includes a service zone 24 within the region of the wash tunnel 22 through which the vehicle is transported for a wash cycle. The conveyor system 20 also includes a loading zone 26 adjacent a tunnel entrance 28, where vehicles align and initially load onto the conveyor system 20.

The conveyor system 20 is configured as a dual-belt system comprising a pair of endless belts mounted in a longitudinal direction through the service line 10. The endless belts 36a, 36b are positioned in parallel and spaced-apart relationship relative to one another through the loading and service zones 26, 24. In the region between the pair of endless belts 36a, 36b, there may be positioned a central stationary platform 38 of removable panels that permit access to regions under the pair of endless belts 36a, 36b, in particular for servicing and maintenance. It will be appreciated that where the conveyor system 20 is provided with two or more endless belts to transport the wheeled structure along the service line 10, the endless belts will move in synchronous motion. As the arrangement for each of the endless belts 36a, 36b is substantially identical, the endless belts 36a, 36b are herein collectively referred to as the endless belt 36 unless otherwise specified.

Figure 2B:
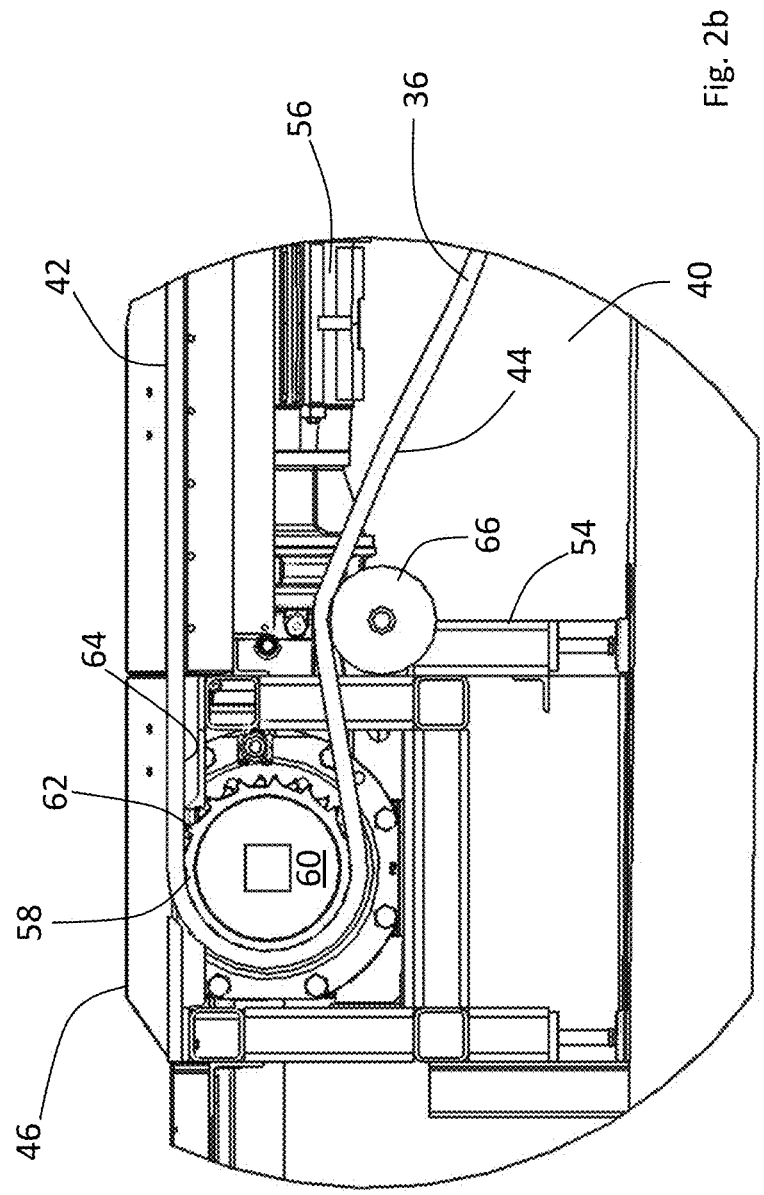
Figure 2C:
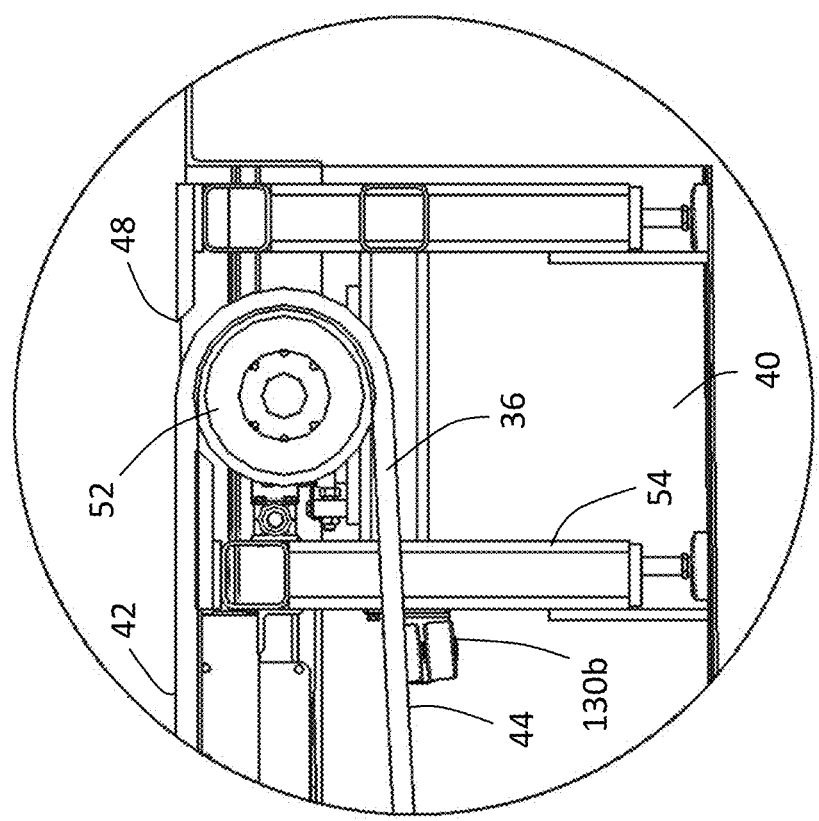

Turning now to FIGS. 2a, 2b and 2c, the conveyor system 20 is generally supported within a trench 40 having a depth suitable to house the required drive and guide mechanisms, and to permit manoeuvrability to service personnel. The endless belt 36 has an upper transport portion 42 and a lower return portion 44, and extends along the conveyor system 20 between a drive end 46 and an idler end 48. The drive end 46 and idler end 48 provide axially elongated rollers 50, 52 rotatably supported on a conveyor frame 54, to guide the endless belt 36 around the respective drive and idler ends 46, 48.

The drive end 46 includes a drive module 56 adapted to engage and move the endless belt around the drive and idler ends 46, 48. The drive module 56 may be an electric motor as shown, and may include at least one drive member 58 to engage the endless belt 36 and move it around the respective drive and idler ends 46, 48. As shown, the drive member 58 is provided in the form of a sprocket drum 60 adapted with teeth 62 to engage complementary tracks (not shown) on the inward surface 64 of the endless belt 36. The conveyor system 20 will additionally include guide members 66 supported upon the conveyor frame 54 to support the lower return portion 44 of the endless belt 36 as it moves back towards the idler end 48 on the underside of the conveyor system 20. As shown, the guide members 66 are provided in the form of rollers.

In motion, the upper transport portion 42 of the endless belt 36 moves in tension from the idler end 48 towards the drive end 46 by drive member 58, while the lower return portion 44 moves in a slackened state from the drive end 46 towards the idler end 48.

Turning now to FIGS. 3a and 3b, shown is an enlarged view of the conveyor system 20 with the endless belt 36 and associated support structure removed to highlight features of the conveyor frame 54. The conveyor frame 54 includes a plurality of cross-members 68 positioned transversely relative to the longitudinal direction of the service line 10. The cross-members 68 are dimensioned to span the width of the trench 40, and are adapted to mount on opposing surfaces 70, 72. Each cross-member 68 also provides at least one footing 74 at approximately a midpoint thereof, extending to a floor 76 of the trench 40 to provide additional load-bearing performance to the conveyor frame 54.

Arranged in the longitudinal direction, the conveyor frame 54 additionally provides a plurality of support rails that extend the longitudinal length of the service line 10, from the idler end 48 to the drive end 46. The support rails are arranged as two inner support rails 78a, 78b and two outer support rails 80a, 80b. The inner support rails 78a, 78b are generally positioned symmetrically about the longitudinal centerline of the service line 10, while the two outer support rails 80a, 80b are situated proximal to the longitudinal walls of the trench 40. The inner support rails 78a, 78b and the outer support rails 80a, 80b may be fixedly attached in place by rivets, threaded fasteners (e.g. bolts), metallurgic bonding (e.g. welded attachment) or any other suitable means to achieve a secure attachment.

Having reference to FIG. 4, the inner support rails 78a, 78b cooperatively define a gap spacing for the central stationary platform 38 provided between the endless belts 36a, 36b. The inner support rails 78a, 78b each provide a respective seat 82a, 82b configured to receive and support the central stationary platform 38. In the embodiment shown, the central stationary platform 38 is provided in the form of fiberglass or thermoplastic grating. In addition, for each endless belt 36, the respective opposing inner and outer rails 78a, 80a define a gap spacing to receive a support deck 84. The support deck 84 generally includes a plurality of modular grid panels 86 adapted to be positioned end to end relative to one another along the longitudinal length of the service line 10. The modular grid panels are provided with a length that aligns the point of contact between adjacent grid panels on a transverse cross-member 68, providing weight-bearing support thereto. The support deck 84 is positioned between the upper transport portion 42 and lower return portion 44 of the endless belt 36, generally in close proximity to the upper transport portion 42. In this way, the support deck 84 provides support to the upper transport portion 42 of the endless belt 36, and thereby a load placed thereon from a wheeled structure placed upon the conveyor system 20. To facilitate sliding of the endless belt over the support deck 84, a wear plate 88 may be provided between the upper transport portion 42 and the support deck 84. The arrangement of the inner and outer support rails 78a, 78b, 80a, 80b may additionally be used to mount the guide member 66 supporting the lower return portion 44 of the endless belt 36. As shown, the inner and outer support rails 78a, 80a provide respective guide hangers 90, 92 that support the guide member 66 in a transverse direction relative to the longitudinal direction of the service line 10. As shown, the guide member 66 is provided with a plurality of rollers 94 that support an outward surface 96 of the endless belt 36 along the lower return portion 44.

Continuing with FIG. 4, also provided between the upper transport portion 42 and the lower return portion 44 of the endless belt 36, and in particular between the support deck 84 and the lower return portion 44 is a debris deflector 98. The debris deflector 98 provides a barrier to protect the lower return portion 44 from debris falling from the support deck 84, in particular where the support deck 84 is provided in the form of the modular grid panels. The debris deflector 98 is generally mounted on an angle directed downwardly towards the longitudinal centerline of the service line. The debris deflector 98 may be mounted on dedicated brackets, or may be mounted on the guide hangers 90, 92 used for supporting the guide members 66 (as shown). The debris deflector 98 is generally configured to provide a contiguous barrier between adjacent cross-members, so as to maximize the protection from falling debris. In some embodiments, the debris deflector 98 may be provided in the form of multiple panels arranged and fastened in side-by-side relationship to one another.

It will be recognized that the arrangement of the support deck 84, the debris deflector 98 and the longitudinally-spaced cross-members 68 define a partial enclosure in the region between the upper transport portion 42 and the lower return portion 44 of the endless belt 36. To assist in reducing the likelihood of freezing conditions on the conveyor system 10, in particular sections exposed to the outside environment, such as the loading zone 26 shown in FIG. 1, at least a portion of the conveyor system 20 may include a heater in these partial enclosures between adjacent cross-members 68. Referring to FIGS. 3 and 4, the conveyor system 20 provides a heater 100 positioned between the support deck 84 and the debris deflector 98, extending in the longitudinal direction across one or more of the partial enclosures delimited longitudinally between adjacent cross members 68. Accordingly, the partial enclosures containing the heater 100 provide a region of higher heat concentration relative to other areas within the trench 40, in particular the area below the debris deflector 98. In this way, the support deck 84, the endless belt 36 supported thereon, and the wear plate 88 positioned therebetween receive heat from the region of higher heat concentration, thereby reducing the likelihood of a freeze event in the conveyor system 20. It will be appreciated that freeze events in conveyor systems can result in extensive damage to the endless belt 36 and/or drive module 56.

To enable passage of the heater 100 between adjacent partial enclosures separated by the cross-members 68, the cross-members 68 are adapted with one or more pass-through apertures 102, depending on whether the heater is adapted to pass once through the desired heated portion, or in a serpentine path therethrough. In the embodiment shown in FIG. 4, two pass-through apertures are provided for each side of the conveyor system 20.

It will be appreciated that the heater 100 may take on a variety of forms. For example, the heater 100 may be configured as a convective heater, such as a convective tube heater including both smooth and finned-tube varieties. A convective tube heater will generally be part of a fluid circuit having an electric or gas-fired heater module to deliver a heated fluid therein. The heater 100 may also be configured as a radiant heater such as a gas-fired radiant tube heater.

The debris deflector 98 may be formed from any suitable material including but not limited to metal (e.g. steel, aluminum, etc.), thermoplastics (e.g. polypropylene, polyethylene, etc.) and composites. To promote direction of the emitted heat from heater 100 towards the support deck 84, the debris deflector 98 may be adapted with at least a selected level of thermal reflectivity. The thermal reflectivity may be achieved by constructing the debris deflector 98 in the form of a radiant barrier. Alternatively, a radiant barrier may be separately formed and applied to the debris deflector 98, for example in the form of a thin radiant barrier sheet attached thereto. Radiant barriers are typically highly reflective materials (e.g. aluminum or polished stainless steel foil) applied to a substrate. Exemplary substrates may include kraft paper, oriented strand board, plastic films and plywood. For environments that experience high moisture levels, for example a car wash tunnel, the substrate may be of metal or thermoplastic construction. Exemplary thermoplastic substrates may include polypropylene or polyethylene foam core. In general, the material applied to the substrate should exhibit an emittance of less than 0.25, as measured by ASTM C1371. In addition to polished metallic films, low-emittance coatings such as metal oxide may be used on a suitable substrate. It will be appreciated that the side of the debris deflector 98, or separately formed sheet, facing the support deck 84 is the side adapted to receive the highly reflective material. In other words, the highly reflective material, and thus the effective side of the radiant barrier is intended to face the region of higher heat concentration between the debris deflector 98 and the support deck 84.

Figure 6:
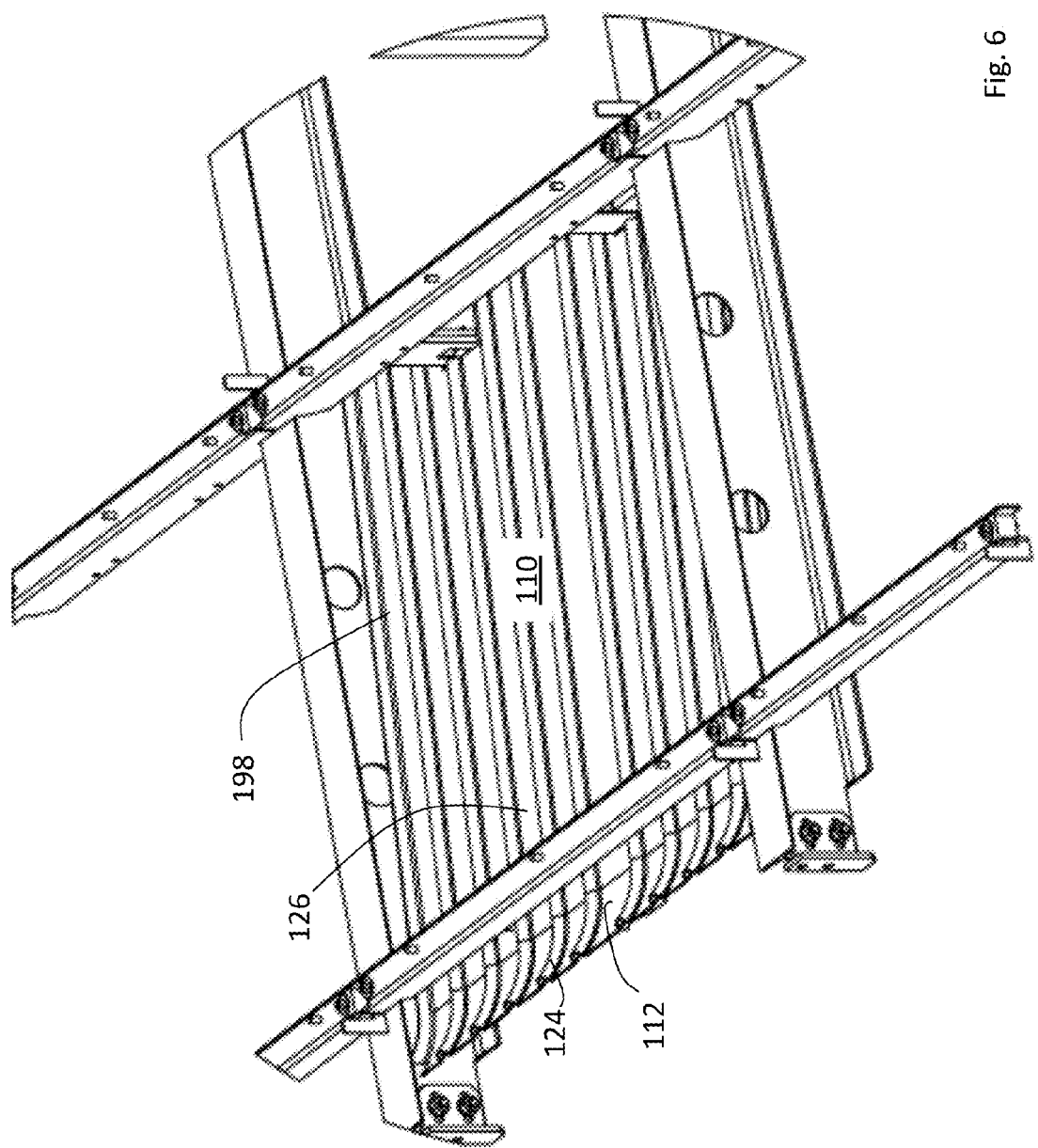
FIG. 6 is a partial isometric of the debris deflector according to the embodiment of FIG. 5.

Having regard to FIGS. 5 and 6, shown is a debris deflector 198 according an alternative embodiment. As the debris deflector 198 is arranged in the conveyor system 20 in substantially the same way as debris deflector 98, only the differences associated with this alternative embodiment are discussed. The debris deflector 198 includes a debris portion 110 that is positioned under the support deck 84, and a water collection portion 112 that extends outwardly therefrom, towards a respective side wall of the trench 40. The water collection portion 112 is intended to facilitate cleaning of the debris portion 110 of the debris deflector 198, without the need for substantial disassembly and associated downtime of the conveyor system. With this arrangement, a sprayer or suitable wash nozzle 114 may be positioned as shown to deliver a stream of water directly upon the water collection portion 112 of the debris deflector 198, promoting a wash effect to remove accumulated debris from the debris portion 110. Access to the water collection portion 112 may be achieved by removing side panels 116, or where the side panels 116 are provided in the form of fiberglass or thermoplastic grating, wash water may be delivered directly therethrough. The use of grates for the side panels 116 will also permit a greater volume of wash and rinse water from the wash tunnel to be captured by the water collection portion 112, enhancing the cleaning effect of the debris deflector 198 during normal wash tunnel usage.

As shown, the water collection portion 112 of the debris deflector 198 is generally arranged at an angle relative to the debris portion 110, with its terminal lateral edge 120 being positioned proximal the underside 122 of the side panel 116. The debris deflector 198 is provided with a curved transition 124 between the water collection portion 112 and the debris portion 110 to deflect the impingement of rinse water, with reduced turbulence, therein resulting in an effective flushing of debris from the debris portion 110 of the debris deflector 198.

The debris deflector 98, 198 may be formed of stamped carbon steel, generally galvanized to provide a rust-inhibiting effect. In an alternative embodiment, the debris deflectors 98, 198 may be formed of a thermoplastic material, for example a polyolefin, and may include suitable fillers or additives to achieve the desired performance characteristics. In general, suitable materials will exhibit resistance to wear, corrosion and pitting, as well as low moisture absorption and low reactivity to chemicals. Suitable materials should also exhibit a general non-stick behavior (i.e. as achieved through improved surface smoothness and a low coefficient of friction) in relation to oil and grease, as well as dirt and salt. In one embodiment, the debris deflector 98, 198 may be formed of polypropylene or polyethylene, and may include glass fibers to improve impact performance at low temperature.

When formed of thermoplastic material, the debris deflector 98, 198 may be formed via any suitable molding process, including but not limited to vacuum forming, compression molding and thermoforming. When molded, a thermoplastic debris deflector may incorporate one or more structural ribs 126 (as seen in FIG. 6). The structural ribs 126 provide additional rigidity to the debris deflector 98, 198, and establish sluice-like channel-ways 128 that direct water flow, enhancing the wash effect.

As stated earlier, and having regard to FIG. 2a, the upper transport portion 42 of the endless belt 36 moves in tension from the idler end 48 towards the drive end 46 by drive member 56, while the lower return portion 44 moves in a slackened state from the drive end 46 towards the idler end 48. In the slackened state, the lower return portion 44 of the endless belt 36 may be subject to greater lateral movement, having the potential to create belt tracking and alignment issues. This is particularly evident at the idler end 48 where the axially elongated roller 52 is not provided with engagement teeth as found on the opposing drive member 58 at the drive end 46. Misalignment and poor tracking of the endless belt 36 can cause excessive wear on the conveyor mechanism, necessitating increased maintenance and associated downtime. Issues of misalignment of the endless belt 36 can increase upon aging of the endless belt 36, generally due to belt stretch. Accordingly, in an alternative embodiment, a least one pair of lateral guide rollers are incorporated into the conveyor system 20.

Figure 7:
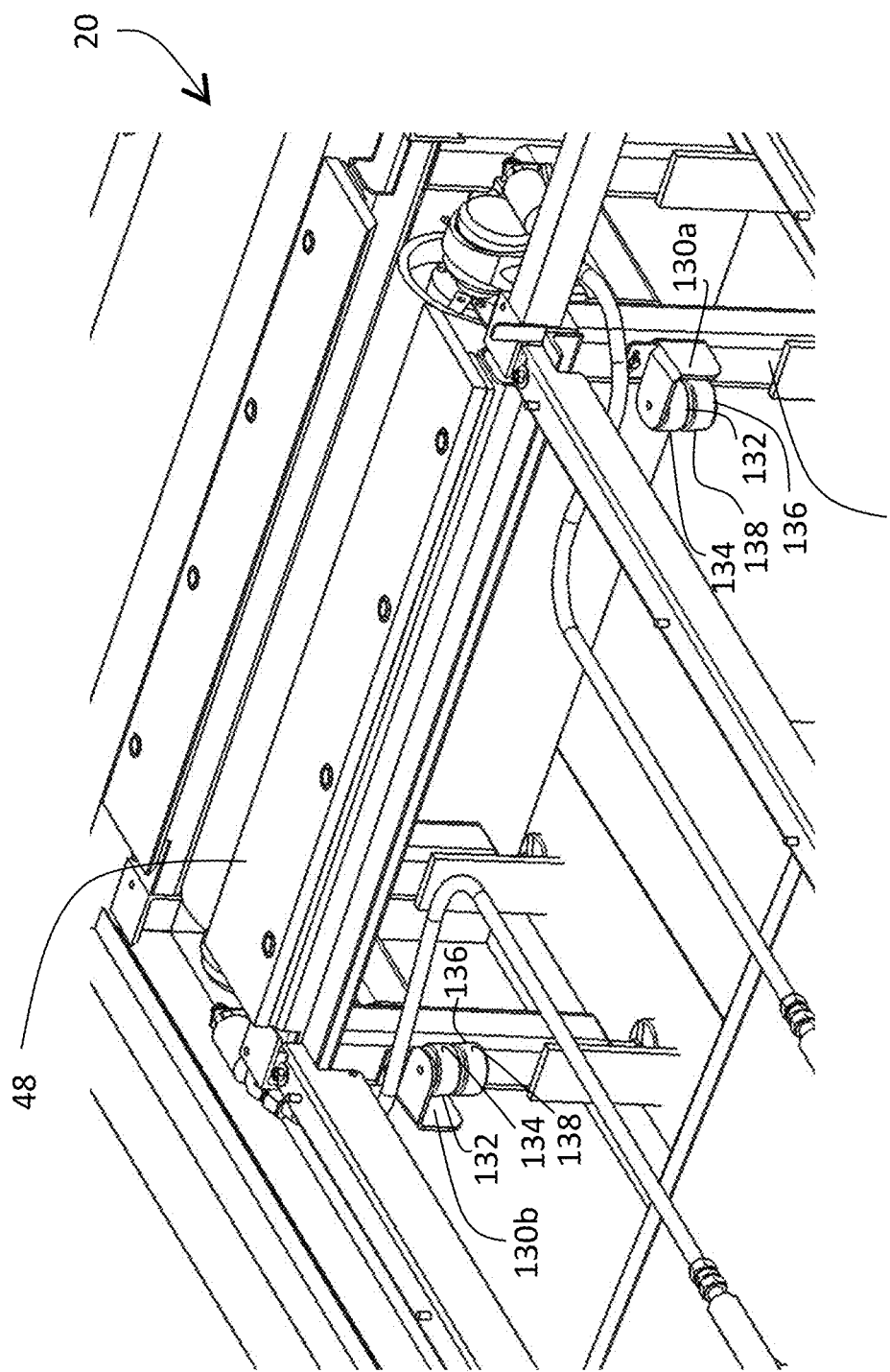
FIG. 7 is a partial isometric view of the conveyor system according to FIG. 1, showing the use of lateral guides on the idler end.

Having regard to FIG. 7, shown is the idler end 48 of the conveyor system 20, with the endless belt and associated support components removed for clarity. Associated with each endless belt is a pair of lateral guides 130a, 130b, mounted to the conveyor frame 54. The pair of lateral guides 130a, 130b are arranged to engage the lower return portion 44 of the endless belt 36, as best seen in FIG. 2c with respect to lateral guide 130b. Having regard to FIGS. 7 and 8, each lateral guide 130a, 130b is provided with at least one roller (first roller 132) presenting a first roller surface 134 positioned to engage a respective lateral edge of the lower return portion 44 of the endless belt 36. In the embodiment shown, each lateral guide 130a, 130b is presented as having two stacked rollers, that is the first roller 132 and a second roller 136. The addition of the second roller 136 provides a second roller surface 138 positioned to engage the endless belt 36 in a more slackened state. In general, a newly installed endless belt 36 having very little operational time will exhibit less slack, and therein align to the first roller surface 134 of the first roller 132, as shown in FIG. 2c. With usage and ageing of the endless belt, additional slack arising from stretch in the endless belt 36 may cause the endless belt 36 to displace downwardly, with the lateral edges of the lower return portion 44 aligning with the second roller surface 138 of the second roller 136. Accordingly, the lateral rollers 130a, 130b are configured to provide lateral support over the useable lifespan of the endless roller 36.

Figure 8:
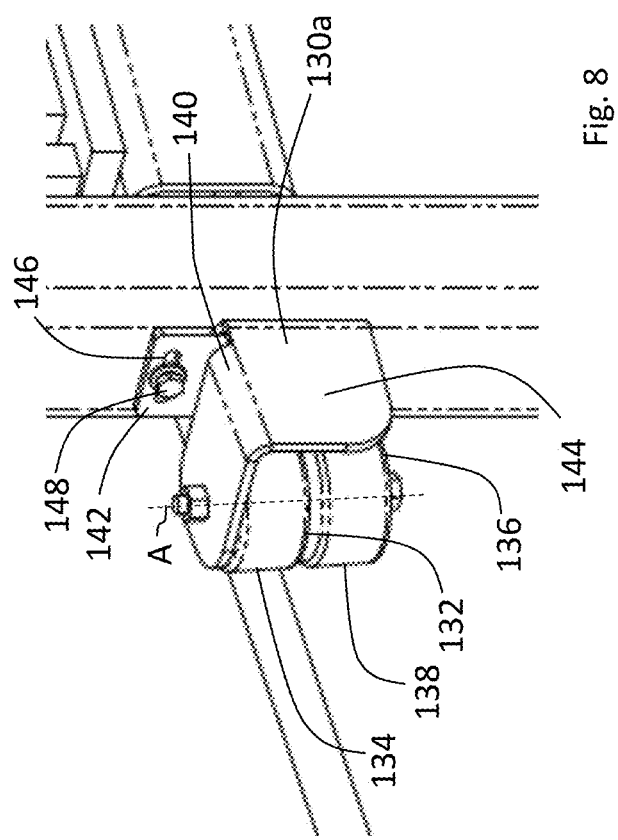
FIG. 8 is an enlarged isometric view of the lateral guide according to the embodiment of FIG. 7.

The lateral guides 130a, 130b generally include the at least one roller (first and second rollers 132, 136 as presented herein) mounted upon a bracket 140, as best seen in FIG. 8. The bracket 140 provides a mount portion 142 that is fastened to the conveyor frame 54, and a roller support portion 144 that receives the at least one roller (rollers 132, 136 in the embodiment shown). The rollers may be any suitable material, including but not limited to polymeric or rubber materials (i.e. rubber-tired caster wheels), and may include a suitable bushing or bearing to facilitate rotation about an axis A. In one embodiment, the bearing may be a sealed bearing to prevent the ingress and fouling of the bearing due to contaminated water and debris. To facilitate lateral adjustability of the lateral guides 130a, 130b, the mount portion 142 of the bracket 140 may be provided with a slotted aperture 146 at each point receiving a fastener (i.e. bolt 148). Accordingly, the lateral guides 130a, 130b can be laterally adjusted as necessary to ensure proper tracking of the endless belt 36. In general, the lateral guides are positioned to ensure continued traction with the edge of the endless belt 36, so as to minimize wear due to sliding friction, in particular with systems having heavier particulate buildup.

Figure 9:
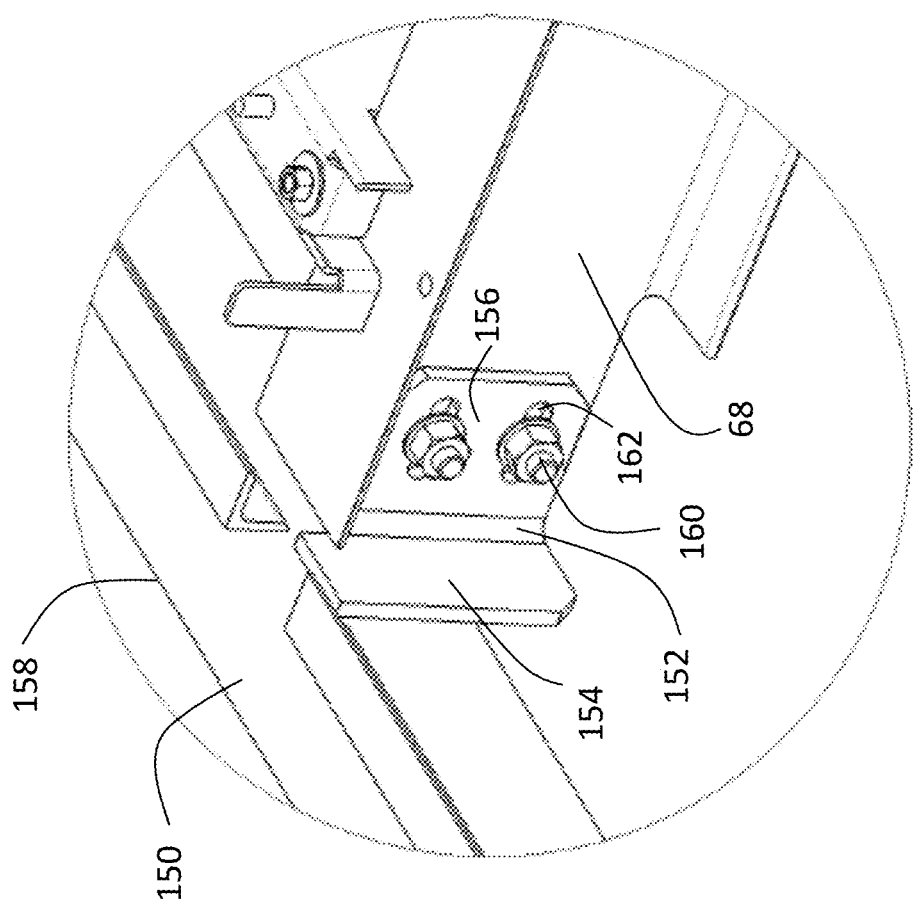
FIG. 9 is a partial isometric view of the conveyor system according to FIG. 1, detailing features of the mount brackets.

Having regard to FIG. 3a, each cross-member 68 may be adapted to mount directly upon the opposing surfaces 70, 72, for example by welded attachment to an anchorage bar 150 embedded in the concrete at the upper longitudinal edge the trench 40. While effective, direct attachment can be labour intensive as supporting the heavy cross member 68 during attachment can be difficult. Accordingly, in an alternative embodiment, the plurality of cross members 68 are attached on opposing ends to a respective cross-member mount bracket 152, as shown in FIG. 9. The cross-member mount bracket 152 includes an anchorage portion 154 configured for attachment to the anchorage bar 150, and a cross-member portion 156 configured to receive and support the cross-member 68. As shown, each side of the trench 40 includes along the upper longitudinal edge 158 the anchorage bar 150, generally provided in the form of angle iron embedded in the concrete. At each location along the trench 40 where a respective cross-member 68 is positioned, a mount bracket 152 is welded to the anchorage bar 150. The mount bracket 152 is easier to locate in relation to a desired vertical elevation on the anchorage bar 150, and may be tack-welded in place prior to permanent attachment to enable alignment and level verification over the longitudinal length of the trench prior to final welding. With all mount brackets 152 welded in position to support the desired arrangement of cross-members 68, the cross-members are attached at opposing ends to respective cooperating mount brackets. Attachment may be achieved using suitable fasteners, for example bolts 160. To permit for lateral adjustment, in particular where the trench 40 may exhibit variation in width along its longitudinal length, the cross-member mount portion 156 of at least one of the cooperating mount brackets 152 is provided with slotted apertures 162 to receive the fastener (bolts 160). In this way, slight variations in width of the trench 40 are accommodated by the mount brackets 152, reducing the need for custom-sized components.

As stated previously, the wear plate 88 facilitates sliding of the endless belt 36 over the support deck 84, and is located between the upper transport portion 42 and the support deck 84, as best seen in FIG. 4. Having regard to FIGS. 10 and 11, shown is a portion of the conveyor system 20 with the endless belt removed to highlight features of the wear plate 88. The wear plate 88 is supported upon the support deck 84, and is comprised of a plurality of plate members 164 adapted to sit end-to-end relative to one another. Each plate member 164 of the wear plate 88 includes a leading edge 166 and a trailing edge 168, wherein the leading and trailing edges 166, 168 are provided with complementary profiles to facilitate fit and alignment between adjacently positioned plate members 164. In the embodiment shown, the complementary profile is provided in the form of a chevron aligned to the direction of travel of the vehicle through the wash tunnel. At least one of the leading and trailing edges 166, 168 of the plate members 164 may be chamfered to reduce the likelihood of wear upon the endless belt.

Each plate member 164 of the wear plate 88 is provided with a plurality of linear debris slots 170 that permit the evacuation of debris therethrough, so as to reduce the accumulation of debris between the endless belt and the wear plate 88. Each debris slot 170 includes a first slot end 172 and a second slot end 174, and is provided with a width of 10 mm, although widths of between 8 to 12 mm may be implemented. Each debris slot 170 is arranged at an angle θ relative a longitudinal centerline L of the plate member 164. As shown, the debris slot 170 is outwardly angled from the longitudinal centerline L in the direction of the first slot end 172 towards the second slot end 174. The angle θ of each debris slot 170 is 35° relative to the longitudinal centerline L of the plate member 164, although angles between 25° to 45° may be implemented. In general, angle selection is based on observed belt wear. It has been determined that angles within this range, and in particular at 35° relative to the longitudinal centerline L of the plate member 164 result in the least amount of endless belt wear during use, therein increasing the usable lifespan of the endless belt and wear plates.

To further reduce the extent of belt wear during use, the first slot end 172 and the second slot end 174 of each debris slot 170 is provided with an inwardly sloped bevel 176, as shown in FIG. 12a. It has been determined that maximum wear of the endless belt occurs where the endless belt passes over a sharp edge perpendicular to the direction of belt travel. Accordingly, with the first and second slot ends 172, 174 having the inwardly sloped bevel 176, in particular at the second slot end 174, the extent of belt wear is reduced. Between the first and second slot ends 172, 174 of the debris slot 170, the opposing edges 178a, 178b remain unbeveled, that is they remain as sharp edges, as shown in FIG. 12b. As the endless belt is passing over these sections of the debris slot 170 at an angle (i.e. 35° relative to the longitudinal centerline L of the plate member 164), the extent of belt wear is minimal. Moreover, by maintaining these edges sharp as shown, they provide a stripping action to remove debris from the underside of the endless belt, without excessive wear thereto.

It will be appreciated that while both the first and second slot ends 172, 174 are shown as being beveled, in some embodiments, only one of the first and second slot ends 172, 174 is beveled. In an alternative embodiment, only the second slot end 174 is beveled.

In the embodiment shown in FIG. 11, each plate member 164 provides 8 debris slots 170, generally presented in two rows of 4 arranged across the plate member 164. Within each row, the 4 debris slots are arranged in two paired sets of debris slots, with the two paired sets of debris slots being longitudinally offset relative to one another. The arrangement of the debris slots 170 is such that the leading and trailing ends 172, 174 of successive debris slots 170 align, so as to reduce the number of locations having increased potential for belt wear. As shown, alignment between successive debris slots occurs along longitudinal centerline L, as well as alignment line $AL_A$ and alignment line $AL_B$.

It will be appreciated that while each plate member 164 is shown as having 8 debris slots 170, in other embodiments, the number of debris slots 170 may be fewer or greater, depending on the extend of debris removal required. While the leading and trailing ends 172, 174 of all debris slots 170 may be machined with the aforementioned inwardly sloped bevel, in some embodiments, only the debris slots 170 arranged proximal the longitudinal centerline L of the plate member 164 may be beveled.

Figure 13:
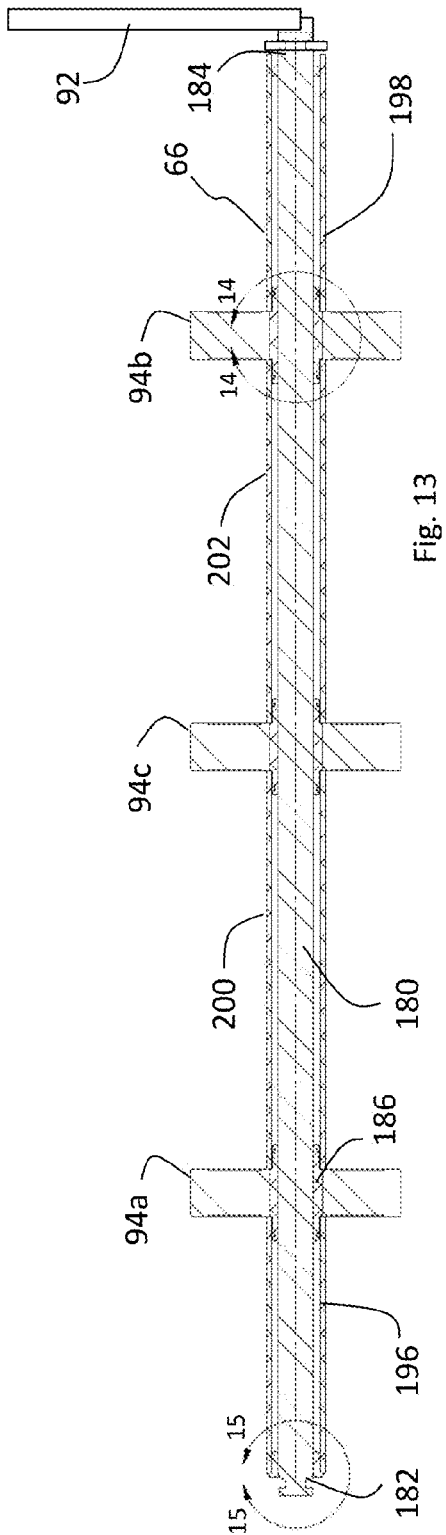
FIG. 13 is an enlarged sectional view of the guide member.
Figure 14:
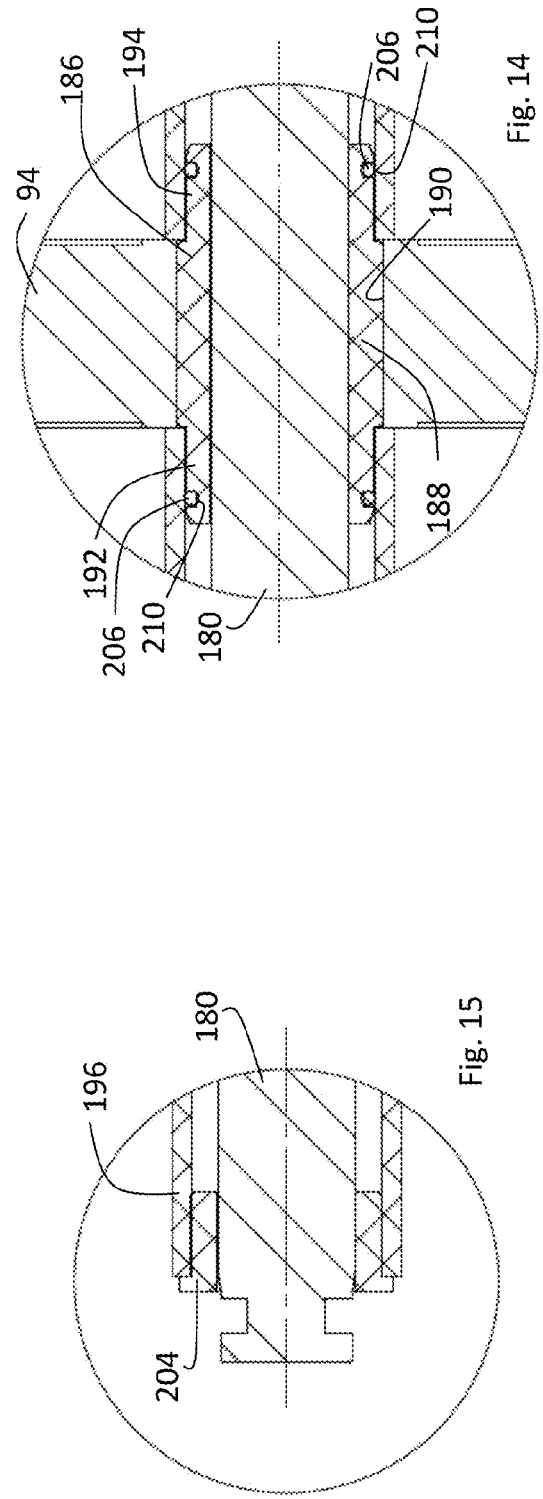
FIG. 14 is a partial sectional view of the guide member with reference to line 15-15 of FIG. 13, detailing features of the roller and thermoplastic bushing.

As shown in FIG. 4, the inner and outer support rails 78a, 80a provide respective guide hangers 90, 92 that support the guide member 66 in a transverse direction relative to the longitudinal direction of the service line 10. Having regard to FIG. 13, shown is the guide member 66 in isolation to highlight specific features thereof. Guide member 66 includes a plurality of rollers 94 (94a, 94b, 94c) mounted on a stationary shaft 180 supported at a first end 182 by guide hanger 90 (not shown for clarity), and at a second end 184 by guide hanger 92. In some embodiments the stationary shaft 180 is a stainless steel shaft, with at least one of the first and second ends 182, 184 being configured with a suitable keyed interface with respective guide hangers 90, 92 to prevent rotation of the stationary shaft 180 relative thereto. Each roller 94 (94a, 94b, 94c) provided is rotatably mounted on the stationary shaft 180 using a suitable bushing or bearing interface therebetween. In the embodiment shown, a low friction thermoplastic bushing 186 is used. Suitable thermoplastics include, but are not limited to acetal (i.e Delrin™). As shown in FIG. 14, the thermoplastic bushing 186 is configured with a central portion 188 that engages a shaft aperture 190 of roller 94, as well as a first bushing extension 192 and a second bushing extension 194. The central portion 188 of the thermoplastic bushing 186 is press-fit or otherwise mounted in the shaft aperture 190, so as to rotate with the roller 94. Accordingly, upon rotation of the roller 94 during use, the thermoplastic bushing 186 rotates upon the stationary shaft 180, with the thermoplastic bushing 186 providing a low friction interface therebetween.

The guide member 66 additionally includes a series of protective sleeves that cover the stationary shaft 180 and serve to protect the interface between the stationary shaft 180 and the thermoplastic bushings 186 from debris and contaminated water. As shown, a first and second outer sleeve 196, 198 is provided between respective guide hangers 90, 92 and the outer rollers 94a, 94b. A first and second inner sleeve 200, 202 is provided between the respective outer rollers 94a, 94b and the middle roller 94c. It will be appreciated that the inner and outer sleeves also serve as spacers to maintain the rollers 94 in the desired position on the stationary shaft 180.

Figure 15:
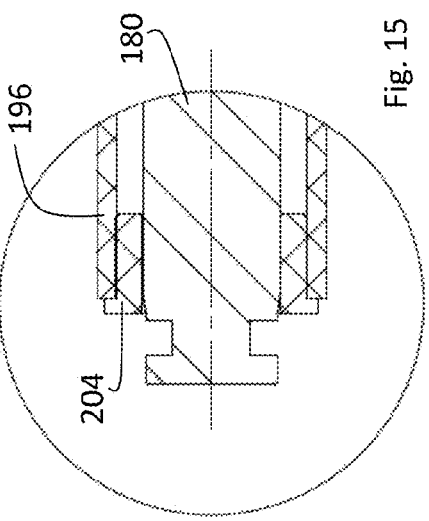
FIG. 15 is a partial sectional view of the guide member with reference to line 14-14 of FIG. 13, detailing features of a first end thereof.

The first and second outer sleeves 196, 198 are configured to remain stationary during use. Accordingly, at each end 182, 184 of the stationary shaft 180, a fixed non-rotatable interface is established between the stationary shaft 180 and the first and second outer sleeves 196, 198 associated therewith. Having regard to FIG. 15 detailing the arrangement at the first end 182, a fixed bushing 204 is provided between the first outer sleeve 196 and the stationary shaft 180. The interface between the stationary shaft 180 and the fixed bushing 204, in particular the outside diameter of the stationary shaft 180 relative to the inside diameter of the fixed bushing 204 is sized to establish an interference fit therebetween. As such, a fixed non-rotatable relationship is established between the stationary shaft 180 and the fixed bushing 204. Similarly, the interface between the fixed bushing 204 and the first outer sleeve 196, in particular the outside diameter of the fixed bushing 204 relative to the inside diameter of the first outer sleeve 196 is sized to establish an interference therebetween. As such, a fixed non-rotatable relationship is established between the fixed bushing 204 and the first outer sleeve 196. Accordingly, the first outer sleeve 196, as well as the second out sleeve 198 which is mounted in an identical manner relative to the second end 184 remain fixed in relation to the stationary shaft 180.

On the opposing end of the first outer sleeve 196, that is where it engages the first bushing extension 192 of the thermoplastic bushing 186 at the roller 94a, the inside diameter of the first outer sleeve 196 relative to the outside diameter of the first bushing extension 192 is sized to establish a slip-fit therebetween. As such, first outer sleeve 196 remains fixed while the thermoplastic bushing 186 is permitted to rotate relative thereto. It will be appreciated that the opposing end of the second outer sleeve 198 is similarly configured relative to the thermoplastic bushing 186 at the roller 94b, so as to achieve the same slip-it relationship therebetween.

Unlike the first and second outer sleeves 196, 198, the first and second inner sleeves 200, 202 are configured to rotate with the rollers 94. Accordingly, having regard to the first inner sleeve 200, the interface between the first inner sleeve 200 and the second bushing extension 194 at roller 94a, in particular the inside diameter of the first inner sleeve 200 relative to the outside diameter of the second bushing extension 194 is sized to establish an interference fit therebetween. Each end of the first inner sleeve 200 is configured in this way, therein causing the first inner sleeve 200 to rotate upon rotation of the rollers 94a, 94c. It will be appreciated that the second inner sleeve is similarly configured, relative to the rollers 94c, 94b.

To reduce the likelihood of contamination of the thermoplastic bushing 186, in particular at the interface between the thermoplastic bushing 186 and the stationary shaft 180, additional seal rings 206 (i.e. rubber O-rings) may be implemented. As shown, a seal ring 206 is provided at the interface between each bushing extension 192, 194 of the thermoplastic bushing 186, and the respective inner sleeve 200, 202 or outer sleeve 196, 198 to which it engages. Seal ring is seated in a suitable channel at the interface, for example as provided by seal ring channel 210 in each of the first and second bushing extensions 192, 194.

Suitable materials for the rollers 94 include, but are not limited to rubber tired wheels (i.e. caster wheels). The use of rubber tired wheels has the benefit of supporting the endless belt without causing damage to the belt surfaces by maintaining traction sufficient to provide continuous rotation of the wheels with belt movement.

It will be appreciated that while the stationary shaft 180 is shown as being solid, in an alternative embodiment, the stationary shaft 180 may be a hollow tube.

In an alternative embodiment, each guide hanger 90, 92 may additionally include a side roller 208, for example as shown in FIG. 16. The side roller 208 may be a rubber tired wheel similar to the rollers 94 of the guide members 66, and are configured to engage the edge of the endless belt 36, maintaining the endless belt 36 laterally centered relative to the opposing guide hangers 90, 92.

It will be appreciated that, although embodiments of the disclosure have been described and illustrated in detail, various modifications and changes may be made. While preferred embodiments are described above, some of the features described above can be replaced or even omitted. Still further alternatives and modifications may occur to those skilled in the art. All such alternatives and modifications are believed to be within the scope of the disclosure.

What is claimed is:

1. A conveyor system for use in moving a wheeled structure through a service line, the conveyor system comprising:
    at least one endless belt mounted in a longitudinal direction through the service line, the endless belt having an upper transport portion adapted to move the vehicle through the service line, and a lower return portion;
    a support deck positioned below the upper transport portion of the endless belt to support the endless belt; and
    a debris deflector mounted between the upper transport portion and the lower return portion of the endless belt to protect the lower return portion from debris falling through the support deck,
    wherein the debris deflector includes a debris portion positioned under the support deck, and a water collection portion that extends outwardly therefrom, to receive a stream of water for flushing the debris portion of accumulated debris.

2. A conveyor system according to claim 1, wherein the debris deflector is configured with a curved transition between the water collection portion and the debris portion, to deflect the stream of water towards the debris portion with reduced turbulence.

3. A conveyor system for use in moving a wheeled structure through a service line, the conveyor system comprising:
    at least one endless belt mounted in a longitudinal direction through the service line, the endless belt having an upper transport portion adapted to move the vehicle through the service line, and a lower return portion;
    a support deck positioned below the upper transport portion of the endless belt to support the endless belt; and
    a debris deflector mounted between the upper transport portion and the lower return portion of the endless belt to protect the lower return portion from debris falling through the support deck,
    wherein the debris deflector is formed of thermoplastic material, having a low coefficient of friction.

4. A conveyor system according to claim 3, wherein the debris deflector is thermoformed.

5. A conveyor system for use in moving a wheeled structure through a service line, the conveyor system comprising:
    at least one endless belt mounted in a longitudinal direction through the service line, the endless belt having an upper transport portion adapted to move the vehicle through the service line, and a lower return portion;
    a support deck positioned below the upper transport portion of the endless belt to support the endless belt; and a debris deflector mounted between the upper transport portion and the lower return portion of the endless belt to protect the lower return portion from debris falling through the support deck, wherein the debris deflector is provided with at least one structural rib aligned transversely to the longitudinal direction of the service line and extending upwardly to establish sluice-like channel-ways that direct water flow.

6. A conveyor system for use in moving a wheeled structure through a service line, the conveyor system comprising:

at least one endless belt mounted in a longitudinal direction through the service line, the endless belt having an upper transport portion adapted to move the vehicle through the service line, and a lower return portion;

a support deck positioned below the upper transport portion of the endless belt to support the endless belt;

a debris deflector mounted between the upper transport portion and the lower return portion of the endless belt to protect the lower return portion from debris falling through the support deck; and a pair of lateral guides arranged to engage respective lateral edges of the lower return portion of the endless belt.

7. A conveyor system according to claim 6, wherein the conveyor system includes an end that is a drive end having a drive module configured for driving the endless drive member, and another end that is an idler end, wherein the pair of lateral guides are provided at the idler end of the conveyor system.

8. A conveyor system according to claim 6, wherein each lateral guide includes a bracket that supports at least a first roller, the first roller presenting a first roller surface positioned to engage the lateral edge of the lower return portion of the endless belt.

9. A conveyor system according to claim 8, wherein the bracket includes a mount portion having slotted apertures that permit for lateral adjustability upon being fastened to a conveyor frame of the conveyor system.

10. A conveyor system according to claim 8, wherein the first roller is made from polymeric or rubber material.

11. A conveyor system for use in moving a wheeled structure through a service line, the conveyor system comprising:

at least one endless belt mounted in a longitudinal direction through the service line, the endless belt having an upper transport portion adapted to move the vehicle through the service line, and a lower return portion;

a support deck positioned below the upper transport portion of the endless belt to support the endless belt;

a debris deflector mounted between the upper transport portion and the lower return portion of the endless belt to protect the lower return portion from debris falling through the support deck; and a conveyor frame including a plurality of cross-members positioned transversely relative to the longitudinal direction of the service line.

12. A conveyor system according to claim 11, wherein the cross-members are dimensioned to span the width of a trench receiving the conveyor system, the cross-members being adapted to mount on respective opposing surfaces of the trench.

13. A conveyor system according to claim 12, wherein each cross-member is attached on opposing ends to an anchorage portion of the trench using a mount bracket.

14. A conveyor system according to claim 13, wherein the mount bracket is provided with slotted apertures that permit for lateral adjustability when attaching the cross-member thereto using fasteners.

15. A conveyor system for use in moving a wheeled structure through a service line, the conveyor system comprising:

at least one endless belt mounted in a longitudinal direction through the service line, the endless belt having an upper transport portion adapted to move the vehicle through the service line, and a lower return portion;

a support deck positioned below the upper transport portion of the endless belt to support the endless belt;

a debris deflector mounted between the upper transport portion and the lower return portion of the endless belt to protect the lower return portion from debris falling through the support deck; and a wear plate located between the upper transport portion of the endless belt and the support deck, the wear plate being supported upon the support deck.

16. A conveyor system according to claim 15, wherein the wear plate is comprised of a plurality of plate members adapted to sit end-to-end relative to one another.

17. A conveyor system according to claim 15, wherein the wear plates include a plurality of debris slots that permit the evacuation of debris therethrough.

18. A conveyor system according to claim 17, wherein the debris slots are arranged at an angle of between 25° to 45° relative to the longitudinal centerline of the plate member.

19. A conveyor system according to claim 17, wherein the debris slots are arranged at an angle of 35° relative to the longitudinal centerline of the plate member.

20. A conveyor system according to claim 17, wherein the debris slots include a first slot end and a second slot end, and wherein at least one of the first and second slot ends of the debris slots have an inwardly sloped bevel.

21. A conveyor system for use in moving a wheeled structure through a service line, the conveyor system comprising:

at least one endless belt mounted in a longitudinal direction through the service line, the endless belt having an upper transport portion adapted to move the vehicle through the service line, and a lower return portion;

a support deck positioned below the upper transport portion of the endless belt to support the endless belt;

a debris deflector mounted between the upper transport portion and the lower return portion of the endless belt to protect the lower return portion from debris falling through the support deck; and at least one guide member arranged in a transverse direction relative to the longitudinal direction of the service line, the at least one guide member providing support for the lower return portion of the endless belt.

22. A conveyor system according to claim 21, wherein the guide member includes a plurality of rollers mounted on a stationary shaft support on a first end by a first guide hanger, and at a second end by a second guide hanger.

23. A conveyor system according to claim 22, wherein each roller is rotatably mounted on the stationary shaft using a suitable bushing or bearing interface therebetween.

24. A conveyor system according to claim 22, wherein the guide members further comprise protective sleeves that cover the stationary shaft and serve as spacers to maintain the rollers in a set position on the stationary shaft.

* * * * *